(12) United States Patent
Massam et al.

(10) Patent No.: US 9,676,988 B2
(45) Date of Patent: Jun. 13, 2017

(54) PARTICLES FOR USE IN WELLBORE FLUIDS

(75) Inventors: Jarrod Massam, Aberdeen (GB);
Richard Bingham, Katy, TX (US);
Mazin Philip, Houston, TX (US)

(73) Assignees: M-I DRILLING FLUIDS UK LTD, Aberdeen (GB); M-I L.L.C., Houston, TX (US)

( * ) Notice: Subject to any disclaimer, the term of this patent is extended or adjusted under 35 U.S.C. 154(b) by 532 days.

(21) Appl. No.: 13/979,588

(22) PCT Filed: Jan. 12, 2012

(86) PCT No.: PCT/GB2012/050058
§ 371 (c)(1),
(2), (4) Date: Oct. 24, 2013

(87) PCT Pub. No.: WO2012/095668
PCT Pub. Date: Jul. 19, 2012

(65) Prior Publication Data
US 2014/0051607 A1 Feb. 20, 2014

(30) Foreign Application Priority Data
Jan. 12, 2011 (GB) .................................. 1100456.1

(51) Int. Cl.
| | | |
|---|---|---|
| C09K 8/32 | (2006.01) | |
| C09K 8/36 | (2006.01) | |
| C04B 18/02 | (2006.01) | |
| C09K 8/48 | (2006.01) | |
| E21B 21/00 | (2006.01) | |

(52) U.S. Cl.
CPC .............. *C09K 8/36* (2013.01); *C04B 18/02* (2013.01); *C09K 8/48* (2013.01); *E21B 21/00* (2013.01)

(58) Field of Classification Search
CPC . C09K 8/52; C09K 8/40; C09K 8/035; C09K 8/32; C09K 8/467; C09K 2208/10; C09K 2208/12; C09K 8/48; C09K 8/487; C09K 8/602; C09K 8/08; C09K 8/36; C09K 8/584; C09K 8/032; C09K 8/22; C09K 8/42; C09K 8/68; C09K 2208/28; C09K 2208/30; C09K 2208/34; C09K 8/03; C09K 8/06; C09K 8/24; C09K 8/34; C09K 8/426; C09K 8/428; C09K 8/46; C09K 8/473; C09K 8/74; C09K 8/86; E21B 33/138; E21B 7/00; E21B 21/00; E21B 33/13; E21B 43/16; E21B 21/062; E21B 33/14; E21B 37/00; E21B 37/06; E21B 41/0092; E21B 21/002; E21B 21/003; E21B 21/01; E21B 43/26; E21B 49/08
See application file for complete search history.

(56) References Cited

U.S. PATENT DOCUMENTS

| | | | |
|---|---|---|---|
| 4,217,229 A | 8/1980 | Watson | |
| 6,319,459 B1* | 11/2001 | Melody | B22F 3/1025 148/513 |
| 2002/0147113 A1* | 10/2002 | Green | C09K 8/02 507/104 |
| 2004/0127366 A1* | 7/2004 | Bradbury | C09K 3/00 507/100 |
| 2005/0277551 A1 | 12/2005 | Massam et al. | |
| 2008/0108528 A1* | 5/2008 | Matlock | C09K 8/03 507/269 |
| 2010/0016183 A1* | 1/2010 | Roddy | C04B 20/10 507/225 |
| 2010/0230164 A1 | 9/2010 | Pomerleau | |
| 2010/0230169 A1 | 9/2010 | Pomerleau | |
| 2010/0248996 A1* | 9/2010 | Sawdon | C09K 8/36 507/117 |

FOREIGN PATENT DOCUMENTS

| | | | |
|---|---|---|---|
| EP | 1918348 A1 | 5/2008 | |
| SU | 1472473 A1 | 4/1989 | |
| WO | 8902774 A1 | 4/1989 | |
| WO | WO89/02774 | * | 4/1989 |
| WO | 2005118742 A2 | 12/2005 | |
| WO | WO2005/118742 | * | 12/2005 |
| WO | 2009002615 A1 | 12/2008 | |

OTHER PUBLICATIONS

From https://en.wikipedia. org/w/index.php?title=Seawater &printable=yes downloaded on Jan. 29, 2016.*
From https://en.wikipedia, org/w/index.php?title=Seawater &printable=yes downloaded on Jan. 29, 2016.*
http://www.thefreedictionary.com/contacting downloaded on Aug. 26, 2016.*
International Search Report for PCT Application Serial No. PCT/GB2012/050058 dated Apr. 11, 2012.

(Continued)

*Primary Examiner* — Kumar R Bhushan
(74) *Attorney, Agent, or Firm* — Sara K. M. Hinkley

(57) ABSTRACT

The invention provides a method of manufacturing a solid phase barite containing material for use in a wellbore. The method includes the steps of providing the barite containing material having relatively small particles with a particle size distribution of at least 50 vol % particles having a diameter in the range of 1 μm to 10 μm and at least 90 vol % particles having a diameter in the range of 4 μm to 20 μm; and contacting the barite containing material with a liquid in order to form relatively large particles having a particle size distribution with at least 90 vol % of the particles having a diameter of at least 30 μm. There is also described a method of treating a wellbore with a fluid including the barite containing material.

7 Claims, 2 Drawing Sheets

(56) References Cited

OTHER PUBLICATIONS

Figure 1:
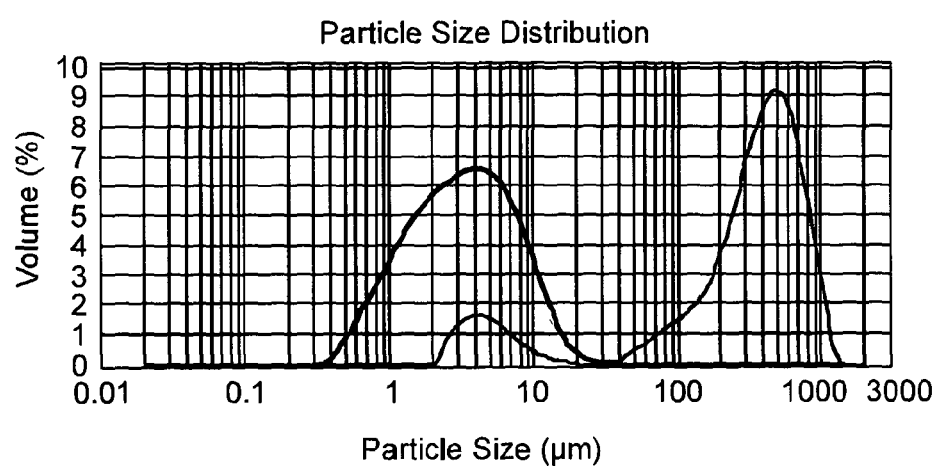

Bennett, "New Drilling Fluid Technology Mineral Oil Mud", SPE 11355—Journal of Premium Technology, vol. 36, No. 6, 1984, pp. 975-981.
Boyd, et al., "New Base Oil Used in Low-Toxicity Oil Muds", Journal of Petroleum Technology, vol. 37, No. 1, 1985, pp. 137-142.
Darley, et al., "Composition and Properties of Drilling and Completion Fluids", Gulf Professional Publishing, 5th Edition, 1988, pp. 328-332.
Geldart, "Types of Gas Fluidization", Powder Technology, vol. 7, 1973, pp. 258-292.
Examination Report issued in AU2012206437 on Apr. 4, 2014, 3 pages.
Search Report issued in GB1100456.1 on May 16, 2011, 2 pages.
First Office Action issued in CN201280008591.6 on Jan. 26, 2015, 16 pages.
Office Action issued in EP12704891.6 on Aug. 19, 2015, 6 pages.
Australian Office Action for corresponding Australian Application Serial No. 2015201702, dated Nov. 26, 2015 (3 pages).

\* cited by examiner

PARTICLES FOR USE IN WELLBORE FLUIDS

This invention relates to barite weighting agents for use in wellbore fluids, especially drilling fluids.

A wellbore fluid serves many important functions throughout the process in drilling for oil and gas. One such function is cooling and lubricating the drill bit as it grinds though the earth's crust. As the drill bit descends, it generates "cuttings," or small bits of stone, clay, shale, or sand. A wellbore fluid serves to transport these cuttings back up to the earth's surface. As drilling progresses, large pipes called "casings" are inserted into the well to line the borehole and provide stability. One of skill in the art should appreciate that these uncased sections of the borehole, which are exposed to the high pressures of the reservoir, must be stabilized before casing can be set; otherwise, a reservoir "kick" or, in the extreme case, a "blowout"—a catastrophic, uncontrolled inflow of reservoir fluids into the wellbore—may occur. A wellbore fluid, if monitored properly, can provide sufficient pressure stability to counter this inflow of reservoir fluids.

A critical property differentiating the effectiveness of various wellbore fluids in achieving these functions is density, or mass per unit volume. The wellbore fluid must have sufficient density in order to carry the cuttings to the surface. Density also contributes to the stability of the borehole by increasing the pressure exerted by the wellbore fluid onto the surface of the formation downhole. The column of fluid in the borehole exerts a hydrostatic pressure (also known as a head pressure) proportional to the depth of the hole and the density of the fluid. Therefore, one can stabilize the borehole and prevent the undesirable inflow of reservoir fluids by carefully monitoring the density of the wellbore fluid to ensure that an adequate amount of hydrostatic pressure is maintained.

It has been long desired to increase the density of wellbore fluids, and, not surprisingly, a variety of methods exist. One method is adding dissolved salts such as sodium chloride, calcium chloride, and calcium bromide in the form of an aqueous brine to wellbore fluids. Another method is adding inert, high-density particulates to wellbore fluids to form a suspension of increased density. These inert, high-density particulates often are referred to as "weighting agents" and typically include powdered minerals of barite, calcite, or hematite.

Naturally occurring barite (barium sulfate) has been utilized as a weighting agent in drilling fluids for many years. Drilling grade barite is often produced from barium sulfate containing ores either from a single source or by blending material from several sources. It may contain additional materials other than barium sulfate mineral and thus may vary in colour from off-white to grey or red brown. The American Petroleum Institute (API) has issued international standards to which ground barite must comply.

These standards can be found in API Specification 13A, Section 2.

Other materials, such as finely divided metals have been used as weighting agents for wellbore fluids, such as found in POT Patent Application W0085/05118, which discloses using iron ball-shaped particles having a diameter less than 250 m and preferably between 15 and 75 m, and calcium carbonate and iron carbonate, as disclosed in U.S. Pat. No. 4,217,229, have also been proposed as weighting agents.

It is known in the art that during the drilling process weighting agents, as well as cuttings, can create sedimentation or "sag" that can lead to a multitude of well-related problems such as lost circulation, loss of well control, stuck pipe, and poor cement jobs.

The sag phenomenon arises from the settling out of particles from the wellbore fluid.

This settling out causes significant localized variations in mud density or "mud weight," both higher and lower than the nominal or desired mud weight. The phenomenon generally arises when the wellbore fluid is circulating bottoms-up after a trip, logging or casing run. Typically, light mud is followed by heavy mud in a bottoms-up circulation.

Sag is influenced by a variety of factors related to operational practices or drilling fluid conditions such as: low-shear conditions, drillstring rotations, time, well design, drilling fluid formulation and properties, and the mass of weighting agents. The sag phenomenon tends to occur in deviated wells and is most severe in extended-reach wells.

For drilling fluids utilizing particulate weighting agents, differential sticking or a settling out of the particulate weighting agents on the low side of the wellbore is known to occur.

Particle size and density determine the mass of the weighting agents, which in turn correlates to the degree of sag. Thus it follows that lighter and finer particles, theoretically, will sag less. However, often reducing weighting agent particle size causes an undesirable increase in the fluid's viscosity, particularly its plastic viscosity. Plastic viscosity is generally understood to be a measure of the internal resistance to fluid flow that may be attributable to the amount, type or size of the solids present in a given fluid. It has been theorized that this increase in plastic viscosity attributable to the reduction in particle size-and thereby increasing the total particle surface area-is caused by a corresponding increase in the volume of fluids, such as water or drilling fluid, adsorbed to the particle surfaces. Thus, particle sizes below 10 m were disfavoured.

WO2005/11874 overcame this problem by using, for example, a barite weighting agent having an average particle diameter of between 1 micron and 8 micron which possesses increased density and so is resistant to sag, without a significant increase in viscosity. This weighting agent functions very successfully for its intended purpose.

However the inventors of the present invention have noted that one limitation of the barite based particles described in WO2005/11874 is the difficulty in transporting them. Conventionally small particles are transported pneumatically from silo to barge, and then onto drilling facility, by the use of tubes through which the particles are blown. Facilities for such transportation are provided, normally by third parties, at various points where the dry particles are to be moved in this way at various points between the manufacturer and the end user.

Specialised air blowers are used in the paints industry to move particles of the size as those described in WO2005/11874, but the inventors of the present invention consider the replacement of the existing pneumatic infrastructure to transport particles to be unrealistic given it works adequately for most other particles.

Thus supply of the barite particles described in WO2005/11874 has been limited to provision in large bags which is more expensive to transport and for some installations, it is not possible to deploy the particles in this way; thus restricting the market for the product.

An object of the present invention is to overcome or mitigate a problem or limitation of the prior art.

According to a first aspect of the present invention, there is provided a method of manufacturing a solid phase barite containing material for use in a wellbore, the method comprising:

providing the barite containing material having relatively small particles with a particle size distribution of at least 50 vol % particles having a diameter in the range of 1 μm to 10 μm and at least 90 vol % particles having a diameter in the range of 4 μm to 20 μm;

contacting the barite containing material with a liquid in order to form relatively large particles having a particle size distribution with at least 90 vol % of the particles having a diameter of at least 30 μm.

The present invention also provides a method of treating a wellbore with a fluid, the method comprising:

(a) providing a barite containing material having relatively large particles with a particle size distribution with at least 90 vol % of the particles having a diameter of at least 30 μm;

(b) dispersing the barite containing material under shear conditions in a fluid such that following dispersion the fluid contains relatively small particles having a particle size distribution of at least 50 vol % particles having a diameter in the range of 1 μm to 10 μm and at least 90 vol % particles having a diameter in the range of 4 μm to 20 μm;

(c) introducing the barite containing material to the wellbore.

Steps (b) and (c) may be conducted in either order or simultaneously but preferably step (b) is conducted before step (c).

Typically step (c) includes introducing the fluid containing the barite containing material into the wellbore.

According to a third aspect of the present invention, there is provided a barite containing material having relatively large particles with a particle size distribution with at least 90 vol % of the particles having a diameter of at least 30 μm; and an agglomerator.

An advantage of embodiments of the present invention is that the relatively large particles may be moved by conventional pneumatic equipment and procedures because they are large enough to be handled in this way. Moreover they revert to the relatively small particles when used, thus maintaining the beneficial properties of such a particles size.

The 'relative' references for the relatively small particles and the relatively large particles, mean relative in size towards each other.

Preferably the relatively large particles have a particle size distribution with at least 90 vol % of the particles having a diameter of at least 40 μm preferably at least 50 μm. Preferably at least 90 vol % of the relatively large particles have a diameter of up to 100 μm, more preferably up to 90 μm.

However certain embodiments may have much larger diameters as larger particles can be pneumatically conveyed. Thus certain embodiments have at least 90% of the relatively large particles having a size of over 500 μm, potentially over 700 μm, optionally in the range of 700-900 μm; although preferably less than 1500 μm.

The relatively small particles may have a particle size distribution with at least 50 vol % particles having a diameter in the range of 4 μm to 8 μm. Moreover the relatively small particles may have a particle size distribution with at least 90 vol % particles having a diameter in the range of 8 μm to 16 μm.

The relatively small particles may be moved in a conveyor from a position (a) to a position (b) and contacted with the liquid at a point or points at or between said positions (a) and (b). The conveyor may be a pin-mixer which moves the particles by way of a screw-drive. The liquid may be contacted with the particles by spraying the liquid towards the particles.

Typically the liquid is an agglomerator.

The amount of liquid used is dependant on a number of factors including the flow rate of the barite through the pin-mixer equipment, the size of agglomerate targeted and the nature of the liquid used. However preferred embodiments normally use 0.6-10 wt %, preferably 0.5-6 wt % liquid/kg of barite.

Preferably the liquid is a water-based solution thus comprising water and an additive. The concentration of the additive will influence both the strength of the relatively large particles as well as the performance of the material in its ultimate drilling or other wellbore fluid application.

Alternatively the liquid can be a non-aqueous liquid, such as a glycol.

A number of different additives may be used. These may included sodium chloride, calcium chloride, lignosulphonate, natural gum products such as guar gum, glycols, commercially available binders. Other additives may include EMI-759, emulsifiers, and other additives conventionally used for oil base mud systems as opposed to being used as binders.

Preferably the additive does not have a detrimental effect on the overall performance on the drilling or other wellbore fluid it is used in.

After forming the relatively large particles, these particles are preferably partially dried, preferably to lose 0.1 wt-10 wt % of their liquid, optionally about 1 wt %. This mitigates moisture loss through "sweating" during storage.

The shear conditions to cause the dispersion of the relatively large particles into the relatively small particles.

Embodiments of the present invention are particularly applicable to use in oil-based wellbore fluids although may also be used in water-based wellbore fluids.

In order to test the performance of the particles, a number of different tests may be conducted. To determine the rheology, viscosity tests are normally used at various rpm. To determine stability, gel strength and electrical stability are used.

Preferably the relatively small particles in accordance with the second aspect of the invention (that is the dispersed particles after agglomeration), show performance in at least one, preferably all of theses tests, within 25%, preferably within 10%, more preferably 2% of the performance of the relatively small particles in the same tests according to the first aspect of the invention (that is the relatively small particles before agglomeration.)

To assess the fluidisablility of the particles, an air-permeability column may be used.

To assess the strength of the agglomerates as they are being conveyed an 'attrition loop' may be used.

As detailed in WO 2005/118742, most of the previous art considered that using sized barite weighting agent in the formulation of a wellbore fluid would result in rheological properties less favourable than when using coarser barite weighting material. Nevertheless, it was in fact found in WO 2005/118742, the disclosure of which is incorporated by reference in its entirety, that a barite weighting agent may be used which exhibits an increased density and therefore improved suspension stability without a significant increase in viscosity.

The fluid of the present invention may be used as a drilling fluid. The barite particles may further be used in any wellbore fluid such as drilling, cementing, completion, packing, work-over (repairing), stimulation, well killing, spacer fluids and other uses of high density fluids such as in a dense media separating fluid or in a ship's or other vehicle's ballast fluid. Thus the method of the present invention should be construed as a method of performing these functions.

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low permeability filter cake that seals openings in formations penetrated by the bit and act to reduce the unwanted influx of formation fluids from permeable rocks.

Drilling fluids are typically classified according to their base material. In oil base fluids, solid particles are suspended in oil, and water or brine may be emulsified with the oil. The oil is typically the continuous phase. In water base fluids, solid particles are suspended in water or brine, and oil may be emulsified in the water. The water is typically the continuous phase.

Invert emulsion fluids, i. e. emulsions in which a non-oleaginous fluid is the discontinuous phase and an oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and, the downhole area and assembly, and penetrating salt beds without sloughing or enlargement of the drilled hole.

Oil-based drilling fluids are generally used in the form of invert emulsion muds.

An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein. Also reference is made to the description of invert emulsions found in Composition and Properties of Drilling and Completion Fluids, 5th Edition, H. C. H. Darley, George R. Gray, Gulf Publishing Company, 1988, pp. 328-332, the contents of which are hereby incorporated by reference.

As used herein the term "oleaginous liquid" means oil which is a liquid at 25. degree. C. and immiscible with water. Oleaginous liquids typically include substances such as diesel oil, mineral oil, synthetic oil such as polyolefins or isomerised polyolefins, ester oils, glycerides of fatty acids, aliphatic esters, aliphatic ethers, aliphatic acetals, or other such hydrocarbons and combinations of these fluids. In one illustrative embodiment of this invention the oleaginous liquid is an polyolefin material which provides environmental degradability to the overall drilling fluid. Such polyolefins should be selected such that the molecular weight permits for a functional invert emulsion drilling fluid to be formulated. Especially preferred are isomerised polyolefins having a carbon backbone of 16 to 18 carbons and in which at least one point of unsaturation is internal.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25. degree. C. and which is not an oleaginous liquid as defined above. Non oleaginous liquids are immiscible with oleaginous liquids but capable of forming emulsions therewith. Typical non-oleaginous liquids include aqueous substances such as fresh water, seawater, brine containing inorganic or organic dissolved salts, aqueous solutions containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

Thus the invention also provides a method of increasing the density of a fluid phase of a drilling fluid, the method comprising adding to the fluid phase of the drilling fluid the barite weighting agent as described herein. Typically the relatively large particles are added to the fluid and sheared to break into the relatively small particles.

One may also add to the wellbore fluid any of the known drilling or other wellbore fluid formulation additives such as emulsifiers, dispersants, oil-wetters, water-wetters, foamers and defoamers to the fluid depending on the particular fluid requirements and rheologies desired.

Thus the additives may be for one or more of the following purposes:

filtration control, high temperature pressure control, rheology control and combinations thereof.

Barite is a naturally occurring mineral composed primarily of barium sulfate. Naturally occurring barite (barium sulfate) has been utilized as a weighting agent in drilling fluids for many years.

Drilling grade barite is often produced from barium sulfate containing ores either from a single source or by blending material from several sources. It may contain additional materials other than barium sulfate mineral and thus may vary in colour from off-white to grey or red brown. The American Petroleum Institute (API) has issued international standards to which ground barite must comply. These standards can be found in API Specification 13A, Section 2.

It is feasible to manufacture drilling or other wellbore fluids also comprising other known minerals such as calcite (calcium carbonate), hematite (iron oxides), or ilmenite.

According to a preferred illustrative embodiment, the barite weighting agent is formed of solid particles that are composed of a material having a specific gravity of at least 4.2. This allows a wellbore fluid to be formulated to meet most density requirements yet have a particulate volume fraction low enough for the fluid to remain pumpable.

According to one illustrative embodiment, the weighted average particle diameter of the relatively small particles measures approximately 4 µm to 15 µm. In another illustrative embodiment, the weighting agent includes at least 50 vol % particles in the range of about 1 µm to about 5 µm. And in another illustrative embodiment, the weighting agent includes at least 90 vol % particles in the range of about 4 µm to about 8 µm.

It has been found that a predominance of the relatively small particles that are too fine (i. e. below about 1 µm) results in the formation of a high rheology paste. Thus the relatively small barite particles are preferably sufficiently small to avoid issues of barite sag and ECD, but not so small as to have an adverse impact on rheology. Thus barite particles meeting the particle size distribution criteria disclosed herein may be utilized without adversely impacting the rheological properties of the wellbore fluids. In one preferred and illustrative embodiment a barite weighting agent has the relatively small particles having a size distribution such that: particles having a diameter less than 1 µm are 0 to 15% by volume; particles having a diameter between 1 µm and 4 µm are 15 to 40% by volume; particles having a diameter between 4 µm and 8 µm are 15 to 30 by volume; particles having a diameter between 8 µm and 12 µm are 5 to 15% by volume; particles having a diameter between 12 µm and 16 µm are 3 to 7% by volume; particles having a diameter between 16 µm and 20 µm are 0 to 10% by volume; particles having a diameter greater than 20 µm are 0 to 5% by volume. In another alternative illustrative embodiment, the barite weighting agent is sized so that the cumulative volume distribution is: <10% is less than 1 µm; <25% is in the range of 1 µm to 3 µm; <50% is in the range of 2 µm to 6 µm; <75% is in the range of 6 µm to 10 µm; <90% is in the range of 10 µm to 24 µm.

Thus the particle size distribution of the relatively small particles of barite weighting agents disclosed herein is considerably finer than API barite.

One may obtain particles of the dimensions disclosed herein in several manners.

One may purchase, commercially, these sized particles, such as for example, a suitable barite product having similar dimensions as disclosed herein. One may also obtain a coarser ground suitable material and then proceed to implement any known technique to further grind the material to the desired dimensions herein. Such techniques include jet-milling, high performance dry milling techniques, or any other suitable techniques for milling powdered products. In one preferred embodiment, appropriately sized particles of barite are selectively removed from the product stream of a convention barite grinding plant. This may include selectively removing the fines from a conventional AR barite grinding operation. The fines are often considered a by-product of the grinding process and conventionally these materials are blended with courser materials to achieve AR grade barite. However, in accordance with the present disclosure, these by-product fines may be further process via an air classifier to achieve the particle size distributions disclosed herein.

Given the particulate nature of the barite weighting agents disclosed herein, additional components may be mixed with the weighting agent to modify various macroscopic properties. For example, anti-caking agents, lubricating agents, and agents used to mitigate moisture build-up may be included.

Alternatively, solid materials that enhance lubricity or help control fluid loss may be added to the barite weighting agents of the present invention. In one illustrative examples, finely powdered natural graphite, petroleum coke, graphitized carbon or mixtures of these are added to enhance lubricity, rate of penetration and fluid loss as well as other properties of the drilling fluid. Another illustrative embodiment utilizes finely ground polymer materials to impart various characteristics to the drilling fluid. In instances where such materials are added, it is important to note that the volume of added material should not have an substantial adverse impact on the properties and performance of the drilling fluids. In one illustrative embodiment, polymeric fluid loss materials comprising less than 5% by weight are added to enhance the properties of the drilling fluid.

Alternatively less than 5% by weight of suitably sized graphite and petroleum coke are added to enhance the lubricity and fluid loss properties of the fluid. Finally in another illustrative embodiment less than 5% by weight of a conventional anti-caking agent is added to assist in the bulk storage of the weighting materials.

The barite particulate materials as described herein may be added as a weighting agent in a dry form or concentrated as slurry in either an aqueous medium or as an organic liquid. As is known, an organic liquid should have the necessary environmental characteristics required for additives to oil-based drilling fluids. With this in mind it is preferred that the oleaginous fluid have a kinematic viscosity of less than 10 centistokes (10 mm/s) at 40 C and, for safety reasons, a flash point of greater than 60 C. Suitable oleaginous liquids are for example diesel oil, mineral or white oils, n-alkanes or synthetic oils such as alpha-olefin oils, ester oils, mixtures of these fluids, as well as other similar fluids for drilling or other wellbore fluid formulation. In one illustrative embodiment of the present subject matters disclosed herein, the desired particle size distribution is achieved via wet milling of the courser materials in the desired carrier fluid.

The barite particles as described herein may comprise one or a combination of several known weighting agents. In one illustrative embodiment, the weighting agent is selected from, but not limited to, barium sulphate (barite), calcium carbonate, dolomite, ilmenite, hematite or other iron ores, olivine, siderite, or strontium sulphate as well as combinations and mixtures of these and other weighting materials. Many factors may determine which weighting agent is most appropriate in any given set of circumstances. Factors such as cost, availability, density, size, or power required for grinding may influence the choice of product used.

Embodiments of the present invention will now briefly be described with reference to FIGS. 1 and 2 which are particle size distribution graphs at various stages of the present invention.

Figure 2:
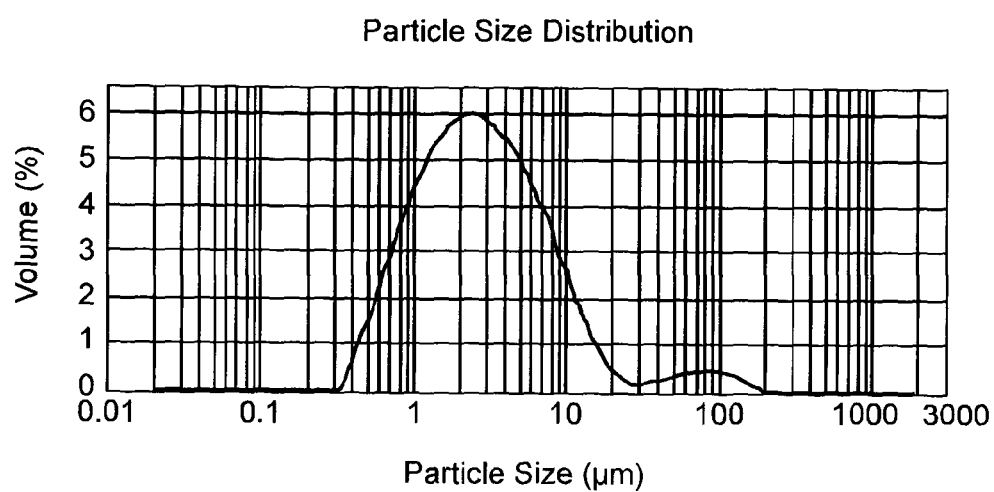

FIG. 1 shows an example of the dry particle size distribution before and after agglomeration, where the micronized barite has d90 of around 8-10 µm and after processing has a d90 of 700-900 µm.

The application of the agglomerated barite in a drilling or completion fluid demands that the material returns to its original micron particle size distribution in an aqueous or non-aqueous system under a reasonable degree of shear. FIG. 2 shows the particle size distribution of an agglomerated barite which has been re-dispersed back to its original particle size in an invert-emulsion.

The invention claimed is:

1. A method of manufacturing a solid phase barite containing material for use in a wellbore, the method comprising:
   providing the barite containing material having relatively small particles with a particle size distribution of at least 50 vol % particles having a diameter in the range of 1 µm to 10 µm and at least 90 vol % particles having a diameter in the range of 4 µm to 20 µm;
   contacting the barite containing material with a liquid in order to form relatively large particles having a particle size distribution with at least 90 vol % of the particles having a diameter of at least 30 µm, wherein the liquid is one or more selected from the list consisting of: solutions of sodium chloride and calcium chloride; lignosulphonate, natural gum products including guar gum, glycols, and commercially available binders.

2. A method as claimed in claim 1, wherein the relatively large particles have a particle size distribution with at least 90 vol % of the particles having a diameter of at least 40 µm.

3. A method as claimed claim 1, wherein the relatively large particles have a particle size distribution with at least 90 vol % of the particles having a diameter in the range of 700-900 µm.

4. A method as claimed in claim 1, wherein the relatively small particles are moved in a conveyor from a position (a) to a position (b) and are contacted with the liquid at a point or points at or between said positions (a) and (b).

5. A method as claimed in claim 1, wherein the solid phase barite containing material contains 0.6-10 wt % of the liquid.

6. A method as claimed in claim 1, further comprising drying the relatively large particles to remove 0.1 wt % to 10 wt % of the liquid.

7. The method of claim 1, wherein contacting the barite containing material with a liquid comprises using a pin-mixer to contact the liquid with the barite containing material.

* * * * *